UNITED STATES PATENT OFFICE.

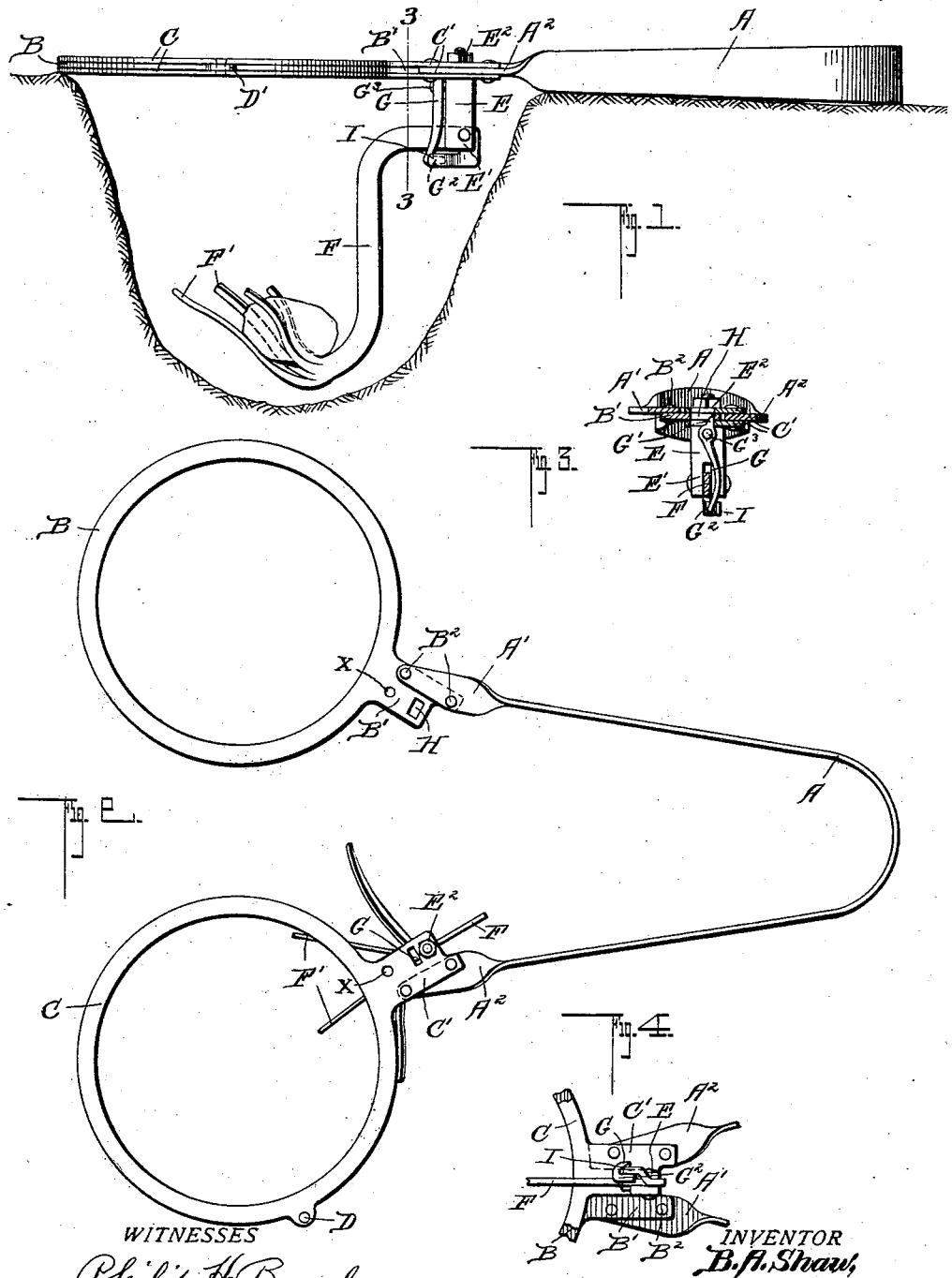

BRUCE A. SHAW, OF DAVENPORT, IOWA.

ANIMAL-TRAP.

1,015,845.   Specification of Letters Patent.   Patented Jan. 30, 1912.

Application filed September 13, 1909. Serial No. 517,427.

*To all whom it may concern:*

Be it known that I, BRUCE A. SHAW, a citizen of the United States, residing at Davenport, in the county of Scott and State of Iowa, have invented a new and useful Improvement in Animal-Traps, of which the following is a specification.

This invention relates to animal traps especially adapted to be used for catching gophers and the like, the object being to provide a trap which is so constructed that the same can be used for catching animals entering a hole or coming out, by simply reversing the same.

Another object of my invention is to provide an animal trap which is so constructed that the animal will pass between the jaws of the same, such a distance before the trap is sprung that it will be impossible for the animal to get out.

A still further object of my invention is to provide a trap with a pair of ring-shaped jaws adapted to be held together when set, so that the same can be readily placed over a baited hole in such a position that it will be impossible for the animal to reach the bait without passing between the ring jaws so that when the trap is tripped, it will be caught between the same when the jaws are forced apart by the action of the spring.

A still further object of the invention is to provide novel means for locking the ring jaws in register with each together with means for releasing the locking means which is adapted to be tripped by the animal passing between the rings.

A still further object is to provide a trap which is exceedingly simple and cheap in construction, and one which is composed of a very few parts which are so connected together that they are not likely to get out of order.

With these and other objects in view, the invention consists in the novel features of construction, combination and arrangement of parts, hereinafter fully described and pointed out in the claims.

In the drawing forming a part of this specification:—Figure 1 is a side elevation of my improved animal trap, showing the same arranged over a baited hole in a set position. Fig. 2 is a top plan view of the trap in a sprung position. Fig. 3 is a section taken on line 3—3 of Fig. 1, and Fig. 4 is an inverted detail top plan view of Fig. 1.

In carrying out my improved invention I employ a bowed spring A which is bowed to such an extent that a substantially U-shaped spring is formed, which has its ends twisted as shown at A', A². Connected to the portion A' of the spring A by rivets B² is the neck portion B' of a ring jaw B which is adapted to fit between and register with a pair of spaced ring jaws C formed of a pair of rings having outwardly projecting neck portions C' which are riveted over the portion A² of the spring A, as clearly shown, and the rings are secured together by a rivet D which extends through lugs formed on the rings, as clearly shown and arranged between the rings on the rivet D is a washer D', for holding the rings in their proper position, so that the ring jaw B can move freely through the ring jaws C, until it engages the washer D' which forms a stop for the same.

Mounted on the neck portions C' of the ring jaws C, is a post E provided with a bifurcated end E' between which is pivotally mounted a tripping or bait holding member F, which is angled as clearly shown, and the extreme end is split and the portions bent outwardly to form prongs F' for holding a bait, as clearly shown in Fig. 1, or if desired the bait can be arranged in the bottom of the hole, under the prongs, so that when the animal endeavors to reach the bait, he will tread on, or strike the tripping member, so as to release the trap, as will be hereinafter fully described.

The post E is preferably formed with a reduced threaded end which is secured within openings formed in the neck portions C' by a nut E², as clearly shown, but it is of course understood that the post can be mounted in any suitable way desired.

The neck portions C' adjacent the post E are slotted, as clearly shown, into which is adapted to extend the upper end G' of a latch G which is pivotally mounted on a pin G³, extending outwardly from the post E, said latch being adapted to fit within a slot H formed in the neck B' of the ring jaw B, this slot forming a catch for the upper end of the latch G, and the lower end of the latch is provided with a rearwardly projecting lug G² adapted to bear against a trigger I formed on the member F, said trigger being offset from the member, as clearly shown and having its end reduced in such a manner that a slight movement of the member F will throw the same out of engagement with the catch, so as to release the same, so as to allow the spring to force the ring jaws apart.

The neck portions of the respective ring jaws are provided with openings X adapted to register with each other, through which a pin is adapted to pass for locking the jaws together to allow the same to be readily shipped or carried from place to place.

The operation of my improved trap is as follows: Supposing that the jaws have been forced together, as shown in Fig. 1, and the same has been placed in position over a baited hole, it of course being understood that the latch has been thrown into the catch, and the trigger into engagement with the lug of the latch, and in this position the trap is set, so that any up or down movement of the bait-holding member F will cause the trigger to pass out of alinement with the lug of the catch and the tension of the spring will cause the latch to swing on its pivot in such a manner that the jaws will be released, so that the animal which has passed between the same will be caught and held firmly. It will be seen that by this construction the latch has such a movement that the same is not subject to any wear to any great extent, and the lower end is rounded so that when the neck of the single ring jaw is forced between the necks of the double ring jaw, it will swing the latch on its pivot until the catch has alined with the slots of the neck carrying the latch, and the same will be thrown into the catch by gravity, if the trap is in position shown in Figs. 1 and 2, and by raising the member F, so as to bring the trigger in alinement with the lug of the latch, the trap will be set, so that the least movement of the member F will throw the trigger out of alinement with the lug of the latch, so as to spring the trap.

The above description is the operation of the trap when in the position shown, but when the trap is placed over a hole in the ground in an inverted position, the member F is dropped down so as to bring the prongs closer to the rings which will prevent an animal from coming out of the hole without striking the member of prongs, so as to trip the trap.

Having thus fully described my invention, what I claim as new and desire to secure by Letters Patent is:—

1. In an animal trap, the combination with a bowed spring, of a ring jaw formed of spaced rings provided with necks secured over one end of said spring, a single ring jaw provided with a neck secured to the other end of said spring adapted to fit between the spaced ring jaw, the neck of the single ring jaw being provided with a slot forming a catch, a post mounted on the neck of the double ring jaw, a latch pivotally mounted on said post for engaging said catch, a tripping member mounted on said post provided with a trigger for engaging said latch, and prongs formed on the end of said tripping member.

2. An animal trap comprising a bowed spring, a pair of rings provided with neck portions secured over one end of said spring forming a double ring jaw, a single ring jaw provided with a neck portion secured to the other end of said spring, said single ring jaw being provided with a catch, a post secured on the neck of the double ring jaw provided with a bifurcated upper end, a pronged tripping member pivotally mounted in the bifurcation of said post, a pin extending outwardly from said post, a latch pivotally mounted on said pin adapted to engage the catch of the single ring jaw when said jaws are brought into register with each other, and a trigger formed on said tripping member for engaging said latch.

BRUCE A. SHAW.

Witnesses:
J. A. HANLEY,
MABELLE BOULTON.

Copies of this patent may be obtained for five cents each, by addressing the "Commissioner of Patents, Washington, D. C."